(12) United States Patent
Almasri et al.

(10) Patent No.: US 11,459,247 B2
(45) Date of Patent: Oct. 4, 2022

(54) IRON OXIDE MODIFIED HALLOYSITE NANOMATERIAL

(71) Applicant: Qatar Foundation for Education, Science and Community Development, Doha (QA)

(72) Inventors: Dema Almasri, Doha (QA); Muataz Hussien, Doha (QA); Said Ahzi, Doha (QA)

(73) Assignee: QATAR FOUNDATION FOR EDUCATION, SCIENCE AND COMMUNITY DEVELOPMENT, Doha (QA)

( * ) Notice: Subject to any disclaimer, the term of this patent is extended or adjusted under 35 U.S.C. 154(b) by 0 days.

(21) Appl. No.: 16/594,454

(22) Filed: Oct. 7, 2019

(65) Prior Publication Data
US 2020/0123025 A1 Apr. 23, 2020

Related U.S. Application Data

(60) Provisional application No. 62/747,966, filed on Oct. 19, 2018.

(51) Int. Cl.
*C02F 1/28* (2006.01)
*B01J 20/12* (2006.01)
*B01J 20/06* (2006.01)
*C02F 101/10* (2006.01)

(52) U.S. Cl.
CPC .............. *C02F 1/281* (2013.01); *B01J 20/06* (2013.01); *B01J 20/12* (2013.01); *C02F 2101/105* (2013.01); *C02F 2305/08* (2013.01)

(58) Field of Classification Search
None
See application file for complete search history.

(56) References Cited

U.S. PATENT DOCUMENTS

2006/0102871 A1* 5/2006 Wang .................... A61L 27/50
252/62.51 R
2006/0163160 A1 7/2006 Weiner et al.
2007/0292459 A1 12/2007 Cooper et al.
(Continued)

FOREIGN PATENT DOCUMENTS

CN 103990429 B 5/2014

OTHER PUBLICATIONS

Szczepanik et al., Synthesis, characterization and photocatalytic activity of TiO2-halloysite and Fe2O3-halloysite nanocomposites for photodegradation of chloroanilines in water, Applied Clay Science, vol. 149, Dec. 1, 2017, pp. 118-126; https://doi.org/10.1016/j.clay.2017.08.016 (Year: 2017).*
(Continued)

*Primary Examiner* — Chester T Barry
(74) *Attorney, Agent, or Firm* — K&L Gates LLP

(57) ABSTRACT

This disclosure relates to a method for the treatment of fluids and provides a nanomaterial for treating fluids. The nanomaterial disclosed can be a halloysite nanotube modified with $Fe_2O_3$. The nanomaterial can be designed to have a selective affinity toward ions such as phosphate and can be used to treat water. The disclosure further includes a method for preparing a material by, for example, modifying a halloysite nanotube with $Fe_2O_3$.

4 Claims, 7 Drawing Sheets

(56) References Cited

U.S. PATENT DOCUMENTS

2018/0305543 A1* 10/2018 Agrawal .................. D01F 6/60

OTHER PUBLICATIONS

Xie., et al., Magnetic halloysite nanotubes/iron oxide composites for the adsorption of dyes, Chemical Engineering Journal, vol. 168, Issue 2, Apr. 1, 2011, pp. 959-963, https://doi.org/10.1016/j.cej.2011.02.031 (Year: 2011).*

Chen, et al.; "Preparation of hollow iron/halloysite nanocomposites with enhanced electromagnetic performances" Royal Society of Chemistry; 2018; (7 pages).

Demori, et al; "Evaluation of surfactants addition as compatibilizers for halloysite nanotubes filled polypropylene nanocomposites"; American Institute of Physics; 2014; (5 pages).

* cited by examiner

IRON OXIDE MODIFIED HALLOYSITE NANOMATERIAL

CROSS-REFERENCE TO RELATED APPLICATION

This application claims the benefit of earlier filing date and right of priority to U.S. Provisional Ser. No. 62/747,966 filed on Oct. 19, 2018, the contents of which is incorporated by reference herein in its entirety.

BACKGROUND

The need to efficiently and effectively treat water and other fluids to control the molecular content is ever-increasing. Some approaches for removing molecules from water include the use of nanostructures such as nanotubules and more specifically, halloysite nanotubules. Some molecules possess a chemical charge and removal thereof is particularly challenging. For instance, anions such as phosphate are particularly difficult to remove from water using nanomaterials that are negatively charged. Clay nano-sorbents are one of the research areas that have significant promise to be applied in the field.

SUMMARY

Excess phosphate in water is known to cause eutrophication, and its removal is imperative. Nanoclay mineral sorbents are widely used in environmental remediation due to their low-cost, adequate availability, environmental compatibility, and adsorption efficiency. Adsorption is reported to be one of the most effective processes for phosphate removal with advantages of low-cost, high efficiency, and simple operation.

A major focus has been on clays as adsorbents due to their relative abundance, environmental compatibility, and adsorption efficiency. Among the clay minerals, halloysite nanotubes (HNTs) possess a negatively charged exterior and a positively charged inner lumen. This provides an increased affinity for anion removal. HNT chemical structure can be similar to that of kaolin (i.e., $Al_2Si_2O_5(OH)_4 \cdot nH_2O$), and is comprised of octahedral alumina crystals in the inner layer and a tetrahedral silica in the outer layer. Its attractive features include high specific surface area, availability of micropores, and presence of positive and negatively charged surface sites. These features have allowed for HNTs to be integrated into various applications; e.g., HNTs are used as reinforcement fillers in polymers, as drug delivery agents, and as nanoreactors/nanotemplates for synthesis of functional materials, as well as in environmental remediation.

This disclosure improves upon the current state of HNT preparation and application for use including in the treatment of fluids such as water. For instance, this disclosure includes the modification of HNT with nano-scale iron oxide (such as $Fe_2O_3$). The HNT can be modified with nano-scale iron oxide under mild conditions. In an embodiment, the modified HNT can be used to remove environmentally significant molecules from water and other fluids.

Additional features and advantages are described herein, and will be apparent from the following Detailed Description. The reader will appreciate the foregoing details, as well as others, upon considering the following detailed description of certain non-limiting embodiments according to the present disclosure.

BRIEF DESCRIPTION OF THE DRAWING

Features and advantages of the present disclosure including a nanomaterial including a modified halloysite nanomaterial and method of preparation and use including for selective ion removal from water described herein may be better understood by reference to the accompanying drawings in which.

DETAILED DESCRIPTION

Figure 1:
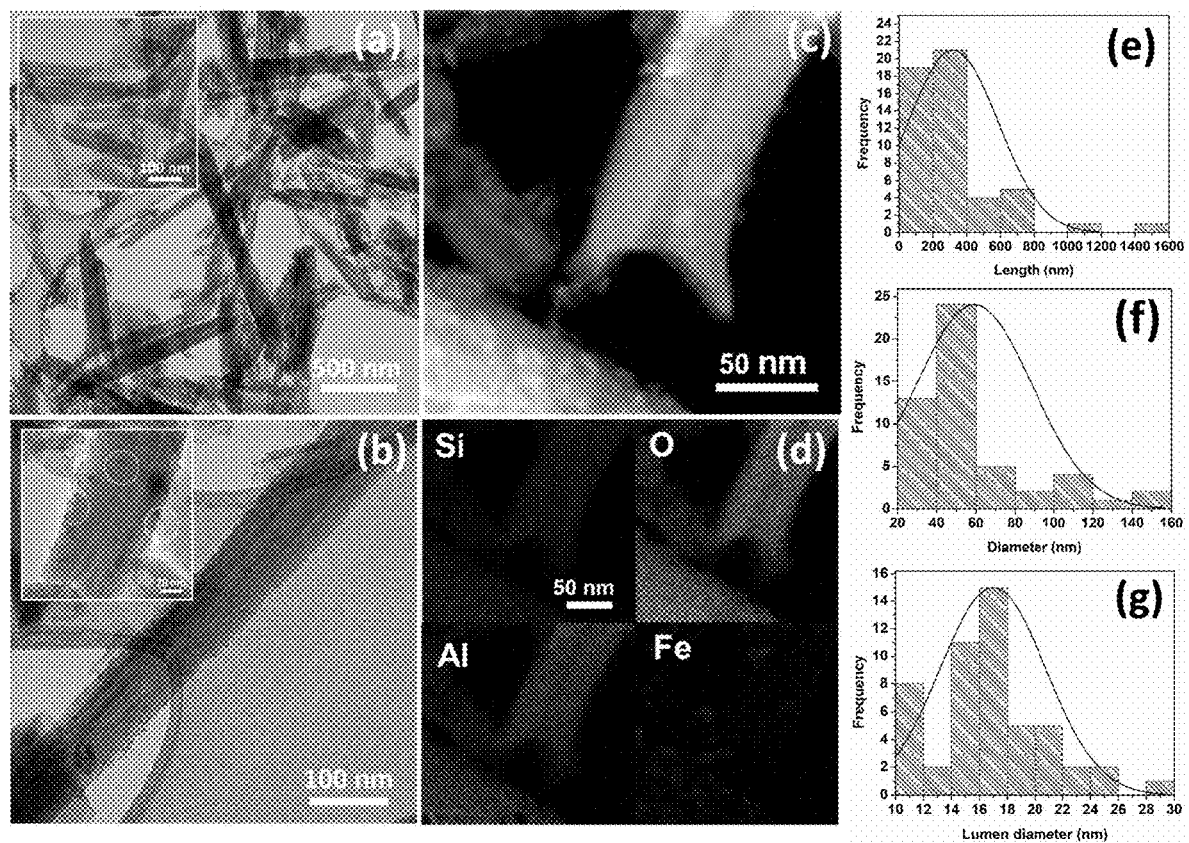
FIG. 1 is a representative TEM micrograph, including (a) raw HNT; (b) STEM images of 1Fe-HNT; (c,d) element-specific images of 1Fe-HNT; (e) length distribution of HNTs; (f) diameter distribution of HNTs; and (g) lumen diameter distribution of HNTs.

The present application generally relates to a nanomaterial including a modified halloysite nanomaterial and method of preparation and use including for selective ion removal from water.

In an embodiment, the modified halloysite nanomaterial can be used for the treatment of fluids, such as water for the removal of molecules such as inorganic pollutants or other ions. For example, this disclosure relates to an adsorbent including the modified halloysite nanomaterial and a method of preparation and use including the treatment of numerous contaminated water types, such as removing anions from water including the treatment of water for inorganic pollutants such as phosphate. The disclosure includes a novel nanohybrid for the use in treating water and can be used for numerous problems related to the molecular content of water. This disclosure includes processes for removing ions such as phosphate with materials such as nanotubules, and particularly halloysite nanotubules. The disclosure includes a nanomaterial including a halloysite nanomaterial (e.g., HNT), modified with nanoscale molecules such as nanoscale iron oxide. This nanohybrid can be used to treat fluids such as water in order to remove certain ions, especially anions such as phosphate. The disclosure includes a method for removing phosphate from water using halloysite nanotubules modified with nanoscale molecules such as iron oxide.

In an embodiment, a halloysite nanomaterial (e.g., HNT) may be modified with nano-scale iron oxide ($Fe_2O_3$) under mild conditions and using a simple preparation procedure. The modified HNT provides enhanced phosphate removal from water according to an embodiment.

This disclosure provides the removal of environmentally important ions, such as phosphate, with a novel nanohybrid. The use of an abundant, environmentally friendly nanotubular clay and its modification using a sustainable approach is provided according to an embodiment. It is particularly challenging to remove anions from water with most nanomaterials that are negatively charged. The material abundance, environmental friendliness, and low-cost are some of the particular advantages of this disclosure. It is particularly challenging to remove anions from water with most nanomaterials, i.e. ions that are negatively charged. This disclosure aids in solving these problems, amongst others including the removal of inorganic pollutants from water and that could be applied in tandem with a wide variety of treatment systems. The nanomaterial can be used for numerous contaminated water types according to an embodiment.

The following is an example of materials that can be used in in preparation of the nanomaterial according to an embodiment. Solutions may be prepared with reagent grade chemicals and deionized water (Milli-Q system). Iron (III) chloride hexahydrate ($FeCl_3 \cdot 6H_2O$) and ammonia were obtained from SureChem (Suffolk, U.K.) and VWR Chemicals (Leuven, Belgium), respectively. Glacial acetic acid was purchased from Fisher Scientific (Fair Lawn, N.J., U.S.A). HNTs and monopotassium phosphate ($KH_2PO_4$) were procured from Sigma-Aldrich Company Ltd. (Saint Louis, Mo., U.S.A.).

The following is an example of the preparation of the nanomaterial including a modified HNT (Fe-HNT) in an embodiment. A modified sol-gel method may be used to surface modify HNTs. In an embodiment, the preparation of the modified HNT may be conducted in the following steps. For example, 3 g of HNT is dispersed in 300 mL Milli-Q water and is magnetically stirred for 1 h. A desired amount (corresponding to the percent iron loadings) of $FeCl_3 \cdot 6H_2O$ is dissolved in 150 mL Milli-Q water and diluted ammonium solution is added to the iron solutions so that the moles of hydroxides (from $NH_4OH$) are three times the moles of iron in the solution to achieve the right proportion to form hydroxyiron ($Fe(OH)_3$). This hydroxyiron solution is then added drop-wise to the HNT mixture and mixed at 350 rpm for 24 h. The dispersion mixture is separated by centrifugation and washed with Milli-Q water several times prior to drying in air, overnight. The dried sample is collected and exposed to glacial acetic acid vapors in a furnace at 80° C. for 2 h. After exposure, the sample is left to dry at the same temperature for 30 min to remove any surface-sorbed acetic acid. The sample is then calcinated at 400° C. for 1 h to obtain the Fe-HNT. Finally, the cooled sample is sieved (100 µm sieve) to remove any sintered or agglomerated fraction. The Fe-HNT samples, prepared at different iron loadings of 0.25, 0.5, 1, and 5 wt. %, are designated in the text as 0.25Fe-HNT, 0.5Fe-HNT, 1Fe-HNT, and 5Fe-HNT, respectively.

The following is an example characterization of the nanomaterial according to an embodiment: The surface morphology of the samples was studied with a JEOL JSM-7610F field emission SEM at an accelerating voltage of 5 kV. TEM images were obtained by placing the sample on lacey carbon film using an FEI Talos F200X TEM, and operating the TEM at 200 kV; the TEM is equipped with an STEM and an energy dispersive X-ray spectroscope (EDX). The specific surface area of HNT and modified HNT was measured with a Micromeritics ASAP 2020 BET N2 (Norcross, Ga., U.S.A.) surface area analyzer at 77 K. A Rigaku ZSX Primus II Wavelength Dispersive XRF (Austin, Tex., U.S.A.) was used to perform elemental analysis, while crystallinity was analyzed with a Rigaku Miniflex-600 XRD (Chapel Hill, N.C.-U.S.A.), equipped with Cu-Kα lamp (λ=0.154 nm). Surface charge was measured with a Mobius (Santa Barbara, Calif., U.S.A.) zeta potential analyzer.

The following is an example batch adsorption protocol of the nanomaterial according to an embodiment: Unless stated otherwise, 3 g $L^{-1}$ of the adsorbent was placed in a centrifuge tube with a 10 mg $L^{-1}$ phosphate solution. The pH of the solution was adjusted with 0.1-1 mg $L^{-1}$ HCl or NaOH. All samples were mechanically mixed on a shaker table (at 350 rpm in HBKU, Qatar and at 240 rpm in Austin, Tex.) at room temperature. For the kinetics and adsorbent dosage studies, the pH of the initial phosphate solution (i.e., pH of 5.0) was not altered (to avoid external chemical perturbation). The most efficient sorbent dose was determined from studies performed with sorbent amount ranging between 0.1 to 8.0 g $L^{-1}$. The sorbent dose used for the proceeding experiments was 3 g $L^{-1}$ as this was found to be the most efficient and economically feasible amount. Kinetic experiments were conducted at time intervals ranging between 0.5 to 240 min to determine the equilibrium contact time and maximum adsorption capacity. Experiments investigating the effect of pH on adsorption capacity were conducted at a pH range of 2 to 10. Experiments investigating the effects of initial phosphate concentration were conducted following the pH experiments at initial phosphate concentrations ranging between 0.5 mg $L^{-1}$ to 100 mg $L^{-1}$ at a fixed pH of 4.0.

The adsorption capacity, $q_t$, at a specific time t and the percent removal of phosphate were calculated based on the following equations:

$$q_t = \frac{(C_0 - C_t)V}{W} \tag{1}$$

$$\% \text{ removal} = \frac{(C_0 - C_t)}{C_0} \times 100\% \tag{2}$$

here, $C_0$ (mg $L^{-1}$), and $C_t$ (mg $L^{-1}$) denote the initial and equilibrium phosphate concentrations, respectively, V(L) is the volume of the solution, and W(g) is the mass of the adsorbent used.

The following is a discussion of kinetics and equilibrium models in an embodiment. In order to evaluate the maximum phosphate uptake and potential rate-controlling steps, three kinetic models (pseudo-first order, pseudo-second order, and intra-particle diffusion models) were applied to capture the adsorption process (on both HNT and 1Fe-HNT). The pseudo first order and pseudo second-order kinetics models are commonly used to obtain information on the equilibrium adsorption capacity of adsorbents. The model that provides the best fit and correlation coefficient is usually used to determine the adsorption capacity (Y.-S. Ho, Review of second-order models for adsorption systems, Journal of hazardous materials, 136 (2006) 681-689).

The pseudo first order and pseudo second order kinetics models provide limited insights into the diffusion mechanism underlying this adsorption process. The Weber and Morris intraparticle diffusion model was used to identify the steps that occurred during the adsorption process and to elucidate whether intra-particle diffusion is the rate-limiting factor. The experimental data was therefore further tested against the Weber and Morris intra-particle diffusion model (W. J. Weber, J. C. Morris, Kinetics of adsorption on carbon from solution, Journal of the Sanitary Engineering Division, 89 (1963) 31-60) which can be expressed as follows:

$$q_t = k_p t^{0.5} + C \tag{3}$$

where, $q_t$ (mg·$g^{-1}$) is the amount of phosphate adsorbed at time t (min), $k_p$ is the intraparticle diffusion rate constant (mg·g·$min^{0.5}$) and C is a constant. The values of $k_p$ and C can be determined from the intercept and slope of the linear plot of $q_t$ versus $t^{0.5}$.

In order to further understand the adsorption mechanism, classical adsorption isotherm models (i.e., Langmuir and Freundlich) were applied to fit the experimental data. These equilibrium models highlight sorbate-sorbent binding interaction and also give insights into possible mechanisms of adsorption. The Langmuir isotherm is based on monolayer adsorption on the active sites of the adsorption surface (L. Borgnino, M. J. Avena, C. P. De Pauli, Synthesis and characterization of Fe(III)-montmorillonites for phosphate adsorption, Colloids and Surfaces A: Physicochemical and Engineering Aspects, 341 (2009) 46-52). A very important characteristic of the Langmuir model is the dimensionless constant ($R_L$), generally known as the separation factor, which was calculated also. The value of $R_L$ indicates whether adsorption is irreversible ($R_L=0$), favorable ($0<R_L<1$), linear ($R_L=1$), or unfavorable ($R_L>1$). The Freundlich isotherm, on the other hand, depicts a non-ideal and reversible adsorption process not restricted to monolayer adsorption (G. Chen, B. Han, H. Yan, Interaction of Cationic Surfactants with Iron and Sodium Montmorillonite Suspensions, Journal of Colloid and Interface Science, 201 (1998) 158-163). This empirical model assumes a heterogeneous surface and that the amount adsorbed increases with solution concentration (C. Luengo, V. Puccia, M. Avena, Arsenate adsorption and desorption kinetics on a Fe(III)-modified montmorillonite, Journal of hazardous materials, 186 (2011) 1713-1719). For maintaining consistency, all phosphate in the text is represented as the orthophosphate ($PO_4$).

The following is an example physical morphology of an embodiment. EM images of raw HNT and 1Fe-HNT reveal the tubular structure of the clays. Clearer illustrations of the structure of the raw HNT and 1Fe-HNT are obtained through HRTEM imaging, as shown in FIG. 1 at (a) and (b), respectively. 1Fe-HNT is chosen for TEM characterization since it is used for the equilibrium experiments. TEM images of the raw HNTs (FIG. 1 at (a)) illustrate the tubular structures of nanoclay, with open ends and a hollow cavity (lumen). A significant difference in HNT size before and after modification (FIG. 1 AT (b)) is not observed. For the 1Fe-HNTs shown in FIG. 1 at (b), it is observed that the $Fe_2O_3$ nanoparticles are anchored on the surface of the HNTs. The average diameter of the $Fe_2O_3$ nanoparticles on the surface of HNTs is found to be 5.6±0.92 nm.

STEM micrographs of 1Fe-HNT (FIG. 1 at (c) and (d)) confirm the presence of Fe. Fe is observed to be distributed throughout the surface of HNTs. Since the surfaces of HNTs are negatively charged aluminosilicates, these could serve as polyanionic surfaces to allow for complex formation with iron cations (M. Amjadi, A. Samadi, J. L. Manzoori, A composite prepared from halloysite nanotubes and magnetite ($Fe_3O_4$) as a new magnetic sorbent for the preconcentration of cadmium (II) prior to its determination by flame atomic absorption spectrometry, Microchimica Acta, 182 (2015) 1627-1633). The length of the raw HNTs range between 68 to 1520 nm (FIG. 1 at (e)), while the external diameter determined to be between 20 to 150 nm (FIG. 1 at (f)). The lumen diameter is found to be between 10 to 28 nm (FIG. 1 at (g)).

Figure 3:
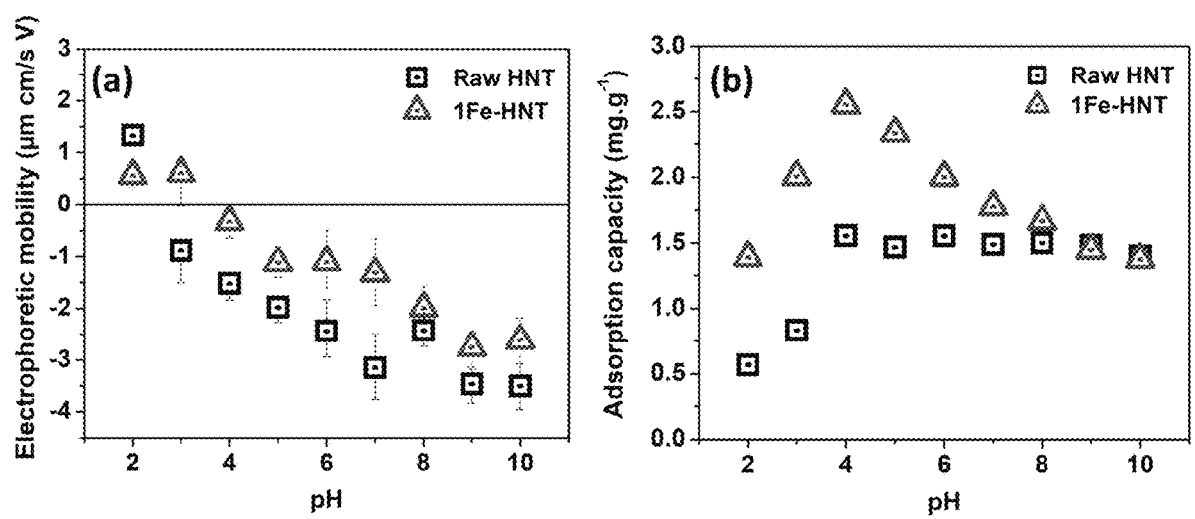
FIG. 3 is a graph of (a) electrophoretic mobility and (b) adsorption capacity values as a function of pH for raw HNT and 1Fe-HNT.

Relative to raw HNT, the specific surface area of the iron oxide modified HNTs is found to increase slightly from 64.4 to 70.5 $m^2/g$ (Table 1). This slight increase could be attributed to the contribution of nano-sized iron oxide particles, hybridized onto the HNTs. FIG. 3 presents the $N_2$ adsorption/desorption isotherms of HNT and modified HNTs at different iron oxide loadings. According to the classifications of International Union of Pure and Applied Chemistry (IUPAC), all isotherms of the raw and modified HNTs were of type II (K. S. Sing, R. T. Williams, Physisorption hysteresis loops and the characterization of nanoporous materials, Adsorption Science & Technology, 22 (2004) 773-782) with H3 hysteresis loops (P. Yuan, P. D. Southon, Z. Liu, M. E. Green, J. M. Hook, S. J. Antill, C. J. Kepert, Functionalization of halloysite clay nanotubes by grafting with γ-aminopropyltriethoxysilane, The Journal of Physical Chemistry C, 112 (2008) 15742-15751; Q. Wang, J. Zhang, A. Wang, Alkali activation of halloysite for adsorption and release of ofloxacin, Applied surface science, 287 (2013) 54-61; P. Sun, G. Liu, D. Lv, X. Dong, J. Wu, D. Wang, Effective activation of halloysite nanotubes by piranha solution for amine modification via silane coupling chemistry, RSC Advances, 5 (2015) 52916-52925). The type II isotherm is indicative of a macroporous structure, however the hysteresis loop of the type H3 ascribes materials that have slit-shaped pores (Z. A. ALOthman, A review: fundamental aspects of silicate mesoporous materials, Materials, 5 (2012) 2874-2902).

The following is an example chemical composition and crystallinity of the nanomaterial according to an embodiment. Table 2 presents the chemical composition of the HNTs, evaluated using X-ray fluorescence. HNTs are primarily composed of silica and alumina with trace amount of CaO, SrO, $TiO_2$, phosphorous pentoxide, and sulfur trioxides. Raw HNTs contain a certain amount of $Fe_2O_3$ (0.59 wt. %), which increases with the increase in reagent loading. Iron content is also shown to increase after hybridization with iron oxide. The amount of iron loading for 0.2, 0.5, 1, and 5Fe-HNT can be deduced from the table to be 0.92, 1.85, 2.47, and 5.98 wt. %, respectively.

Figure 2:
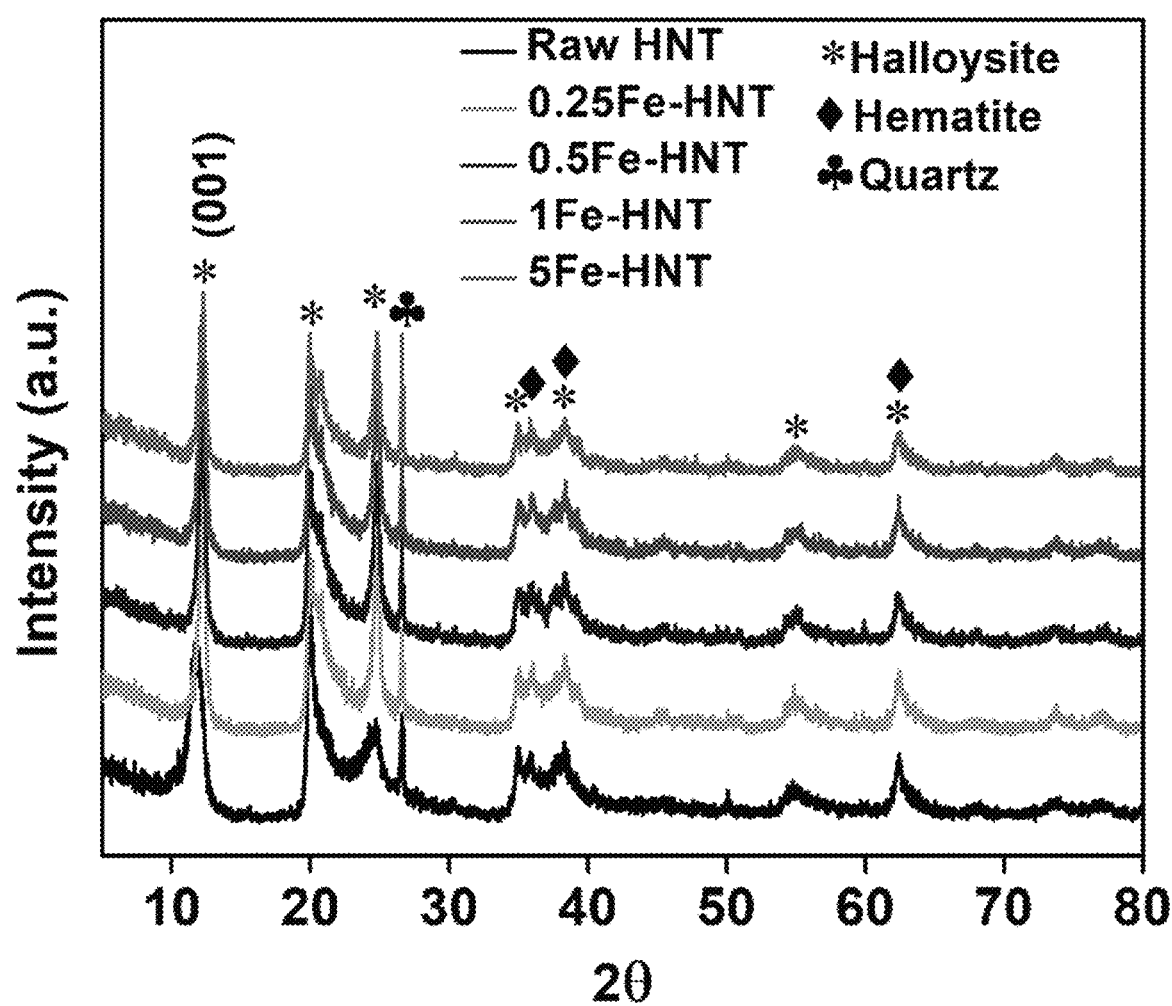
FIG. 2 is an X-ray diffraction of raw HNT and iron oxide modified HNT.

The XRD patterns of raw HNT and iron oxide modified HNTs are shown in FIG. 2. Clay minerals are primarily distinguished by the noticeable basal cleavage of the layered silicate structures. The first order basal reflection (001) for raw HNT is at 7.49 Å, which is indicative of a kaolin-type mineral and of dehydrated halloysite (Brindley, Identification of clay minerals by X-ray diffraction analysis, (1955)). The diffraction peaks at 11.8°, 19.9°, 24.7°, 35°, 38.3°, 54.9°, and 62.5° correspond to the d values of 7.49 Å, 4.46 Å, 3.60 Å, 2.56 Å, 2.35 Å, 1.67 Å, and 1.48 Å, respectively, which can be indexed to raw HNT (K. Zhu, Y. Duan, F. Wang, P. Gao, H. Jia, C. Ma, C. Wang, Silane-modified halloysite/Fe3O4 nanocomposites: simultaneous removal of Cr (VI) and Sb (V) and positive effects of Cr (VI) on Sb (V) adsorption, Chemical Engineering Journal, 311 (2017) 236-246; C. S. Ross, P. F. Kerr, Halloysite and allophane, US Government Printing Office, 1934). The diffraction peaks at 35.9°, 39.2, and 62.5° are attributed to hematite ($\alpha$-$Fe_2O_3$) (R. Blake, R. Hessevick, T. Zoltai, L. W. Finger, Refinement of hematite structure, American Mineralogist, 51 (1966) 123-+; S. Tamás, B. Aristides, T. Vassilios, P. Szilvia, K. László, G. Gábor, M. Kuanyshbek, B. Didara, P. Dimitris, D. Imre, Magnetic iron oxide/clay composites: effect of the layer silicate support on the microstructure and phase formation of magnetic nanoparticles, Nanotechnology, 18 (2007) 285602). The presence of these peaks confirm the existence of iron oxide in the raw and modified HNT.

The following is an example surface charge density and effect of pH on adsorption behavior of an embodiment. The electrophoretic mobility of HNT and 1Fe-HNT as a function of solution pH is shown in FIG. 3 at (a). The positive charge at a low pH for raw HNT can arise from protonation of the hydroxyl groups on the clay edges or at surface defects sites (P. Yuan, P. D. Southon, Z. Liu, M. E. Green, J. M. Hook, S. J. Antill, C. J. Kepert, Functionalization of halloysite clay nanotubes by grafting with γ-aminopropyltriethoxysilane, The Journal of Physical Chemistry C, 112 (2008) 15742-1575; R. Schofield, Effect of pH on electric charges carried by clay particles, European Journal of Soil Science, 1 (1950) 1-8.; M. Sumner, Effect of iron oxides on positive and and negative charges in clays and soils, Clay Minerals Bull, (1963) 218-226). The point of zero charge (PZC) for raw HNT is determined to be 2.5, which is consistent to the values reported in earlier reports (V. Vergaro, E. Abdullayev, Y. M. Lvov, A. Zeitoun, R. Cingolani, R. Rinaldi, S. Leporatti, Cytocompatibility and uptake of halloysite clay nanotubes, Biomacromolecules, 11 (2010) 820-826; P. Yuan, D. Tan, F. Annabi-Bergaya, Properties and applications of halloysite nanotubes: recent research advances and future prospects, Applied Clay Science, 112 (2015) 75-93; S. Mellouk, S. Cherifi, M. Sassi, K. Marouf-Khelifa, A. Bengueddach, J. Schott, A. Khelifa, Intercalation of halloysite from Djebel Debagh (Algeria) and adsorption of copper ions, Applied Clay Science, 44 (2009) 230-236). An interesting feature that should be considered is that the chemical difference in the external and internal surfaces of HNTs, which includes $SiO_2$ (negatively charged) and $Al_2O_3$ (positively charged), respectively. It has been reported that the inner lumen consisting of $Al_2O_3$ maintains a positive charge throughout the pH range of 2.5 to 8.5 (P. Yuan, D. Tan, F. Annabi-Bergaya, Properties and applications of halloysite nanotubes: recent research advances and future prospects, Applied Clay Science, 112 (2015) 75-93; N. G. Veerabadran, R. R. Price, Y. M. Lvov, Clay nanotubes for encapsulation and sustained release of drugs, Nano, 2 (2007) 115-120). This property allows for the selective adsorption of anions in the lumen in the pH range studied. Regarding the graphs in FIG. 3, the initial phosphate concentration was 10 $mgL^{-1}$, the contact time was 240 minutes, the sorbent dosage was 3 $gL^{-1}$, and the shaking speed was 240 rpm.

After modification of the HNTs with iron oxide, the PZC shifted to 3.3. Modifying HNT with iron oxide induces a shift towards a more positive value in mobility throughout most of the pH values, which is consistent with previous observations with hematite modified clay (E. Tombacz, Z. Libor, E. Illes, A. Majzik, E. Klumpp, The role of reactive surface sites and complexation by humic acids in the interaction of clay mineral and iron oxide particles, Organic Geochemistry, 35 (2004) 257-267; L. Cottet, C. Almeida, N. Naidek, M. Viante, M. Lopes, N. Debacher, Adsorption characteristics of montmorillonite clay modified with iron oxide with respect to methylene blue in aqueous media, Applied Clay Science, 95 (2014) 25-31). It is worth noting that the PZC of hematite is 5.8 as published earlier, suggesting that the hematite surfaces hold a positive charge over a wider pH range (E. Tombacz, Z. Libor, E. Illes, A. Majzik, E. Klumpp, The role of reactive surface sites and complexation by humic acids in the interaction of clay mineral and iron oxide particles, Organic Geochemistry, 35 (2004) 257-267; L. Cottet, C. Almeida, N. Naidek, M. Viante, M. Lopes, N. Debacher, Adsorption characteristics of montmorillonite clay modified with iron oxide with respect to methylene blue in aqueous media, Applied Clay Science, 95 (2014) 25-31; X. Zhang, Y. Zhu, Y. Xie, Y. Shang, G. Zheng, A novel macromolecular depressant for reverse flotation: synthesis and depressing mechanism in the separation of hematite and quartz, Separation and Purification Technology, (2017); M. Arias, M. T. Banal, F. Diaz-Fierros, Effects of iron and aluminium oxides on the colloidal and surface properties of kaolin, Clays and Clay Minerals, 43 (1995) 406-416). This phenomenon was also observed by Arias et al. (M. Arias, M. T. Barral, F. Diaz-Fierros, Effects of iron and aluminium oxides on the colloidal and surface properties of kaolin, Clays and Clay Minerals, 43 (1995) 406-416), and was attributed to the adsorption of hematite on the negatively charged silica basal surface of kaolinite resulting in the reduction of the number of negative charges on kaolinite (M. Arias, M. T. Barral, F. Diaz-Fierros, Effects of iron and aluminium oxides on the colloidal and surface properties of kaolin, Clays and Clay Minerals, 43 (1995) 406-416; D. Greenland, Charge characteristics of some kaolinite-iron hydroxide complexes, Clay Minerals, 10 (1975) 407-416). From this information, it could be suggested that the reduction in negative charge of the 1Fe-HNT may arise from the iron oxides being bound to HNT by mutual charge neutralization that occurs between opposites charges surfaces (i.e., iron and clay) (E. Tombacz, Z. Libor, E. Illes, A. Majzik, E. Klumpp, The role of reactive surface sites and complexation by humic acids in the interaction of clay mineral and iron oxide particles, Organic Geochemistry, 35 (2004) 257-267; L. Cottet, C. Almeida, N. Naidek, M. Viante, M. Lopes, N. Debacher, Adsorption characteristics of montmorillonite clay modified with iron oxide with respect to methylene blue in aqueous media, Applied Clay Science, 95 (2014) 25-31; M. Arias, M.T. Barral, F. Diaz-Fienos, Effects of iron and aluminium oxides on the colloidal and surface properties of kaolin, Clays and Clay Minerals, 43 (1995) 406-416). Another theory could be that the negative charges on the HNT are physically blocked by the iron oxides upon hybridization, indicating successful attachment of the iron oxides onto the HNT surfaces; a previous study involving hematite-kaolinite complexes reported a similar observation (M. Sumner, Effect of iron oxides on positive and and negative charges in clays and soils, Clay Minerals Bull, (1963) 218-226).

Since iron dissolution at low pH can be a concern, dissolved iron content is evaluated to rule out this potential complexity arising from dissolution. Dissolution of silica has predominantly been reported to take place at pH<2 and pH>9 (G. B. Alexander, W. Heston, R. K. Iler, The solubility of amorphous silica in water, The Journal of Physical Chemistry, 58 (1954) 453-455). Now, alumina is known to be relatively insoluble in acids and in strong alkali solutions (M. D. Larrañaga, R. J. Lewis, R. A. Lewis, Hawley's condensed chemical dictionary, John Wiley & Sons, 2016; L. Ćurković, M. F. Jelača, Dissolution of alumina ceramics in HCl aqueous solution, Ceramics international, 35 (2009) 2041-2045). Also, previous reports, investigating the effects of pH changes on hematite, conclude that the solubility of hematite is extremely low at pH>3 (S. D. Samson, C. M. Eggleston, Nonsteady-state dissolution of goethite and hematite in response to pH jumps: the role of adsorbed Fe (III), Water-Rock Interactions, Ore Deposits, and Environmental Geochemistry: A Tribute to David A. Crerar, 7 (2002) 61-73). Experiments conducted at a pH of 2 with 1Fe-HNT and a contact time of 240 min revealed the final iron concentration in the solution is less than 0.05 mg/L when filtered with a 0.45 μm filter indicating that the composite material maintains its integrity at a low pH.

The adsorption of phosphate onto raw HNT and 1Fe-HNT has been studied as a function of initial solution over a pH range of 2 to 10 (FIG. 3 at (b)). For raw HNT, the adsorption increased with an increase in pH up to pH 4, beyond which, the change in adsorption is rather insignificant. At pH 2, i.e., below the PZC of HNT, the dominant phosphate species are $H_3PO_4$ and $H_2PO_4^-$, and are present in nearly equal concentrations. The adsorption of phosphate at this point could be attributed to electrostatic attraction between the positively charged external surface of HNT and negatively charged phosphate species. The low adsorption capacity could be attributed to a strong presence of uncharged $H_3PO_4$ species. However, at pH>PZC, the external surface of raw HNT is negatively charged (upon deprotonation) and the adsorption capacity is found to be 1.5 mg·g$^{-1}$. This indicates that phosphate is likely been removed via electrostatic attraction between the anionic species and the positively charged inner lumen of HNTs.

The effect of pH on 1Fe-HNT on the adsorption capacity of phosphate shows a different trend. It is known that hematite modification on kaolinite can induce a change in both its chemical and physical properties (A. Ioannou, A. Dimirkou, Phosphate adsorption on hematite, kaolinite, and kaolinite-hematite (k-h) systems as described by a constant capacitance model, Journal of colloid and interface science, 192 (1997) 119-128). Adsorption of phosphate is observed to have occurred over the entire pH range (i.e., 2 through 10) for both HNT and 1Fe-HNT. HNTs possess a significant amount of hydroxyl groups (P. Luo, Y. Zhao, B. Zhang, J. Liu, Y. Yang, J. Liu, Study on the adsorption of Neutral Red from aqueous solution onto halloysite nanotubes, Water research, 44 (2010) 1489-1497) on the surface and edges. Modification of HNTs with iron oxide nanoparticles increase the hydroxyl groups available on the surface and thus can lead to an increase in the adsorption capacity of the sorbent. At pH 4, the dominant phosphate species is the mono-ionic H$_2$PO$_4^-$ (98%). From FIG. 4 it appears that 1Fe-HNT and raw HNT both have an affinity for phosphate adsorption in this species. The underlying mechanism of decrease in phosphate sorption at higher pH may be explained by the electrostatic repulsion between the negatively charged HNT or 1Fe-HNT exterior and the phosphate anions. Such repulsion has likely prevented interaction of the phosphate anions with the inner lumen of the clay, resulting in a decreased capacity.

The following is an example of the kinetics of adsorption in an embodiment. A significantly rapid adsorption is observed within the first 30 s (see inset in FIG. 4 at (a)) of the reaction and equilibrium is reached in 4 h. The rapid adsorption in the initial stage can be attributed to the unique structure of HNTs. As shown from the electron micrographs, HNTs have large pore diameters ranging between 10 to 30 nm, which can allow easy access of phosphate anions and bind in the inner lumen (W. Jinhua, Z. Xiang, Z. Bing, Z. Yafei, Z. Rui, L. Jindun, C. Rongfeng, Rapid adsorption of Cr (VI) on modified halloysite nanotubes, Desalination, 259 (2010) 22-28). For the graphs in FIG. 4, the initial phosphate concentration was 10 mgL$^{-1}$, the pH was 5, the sorbent dosage was 3 gL$^{-1}$, and the shaking speed was 240 rpm.

Figure 4:
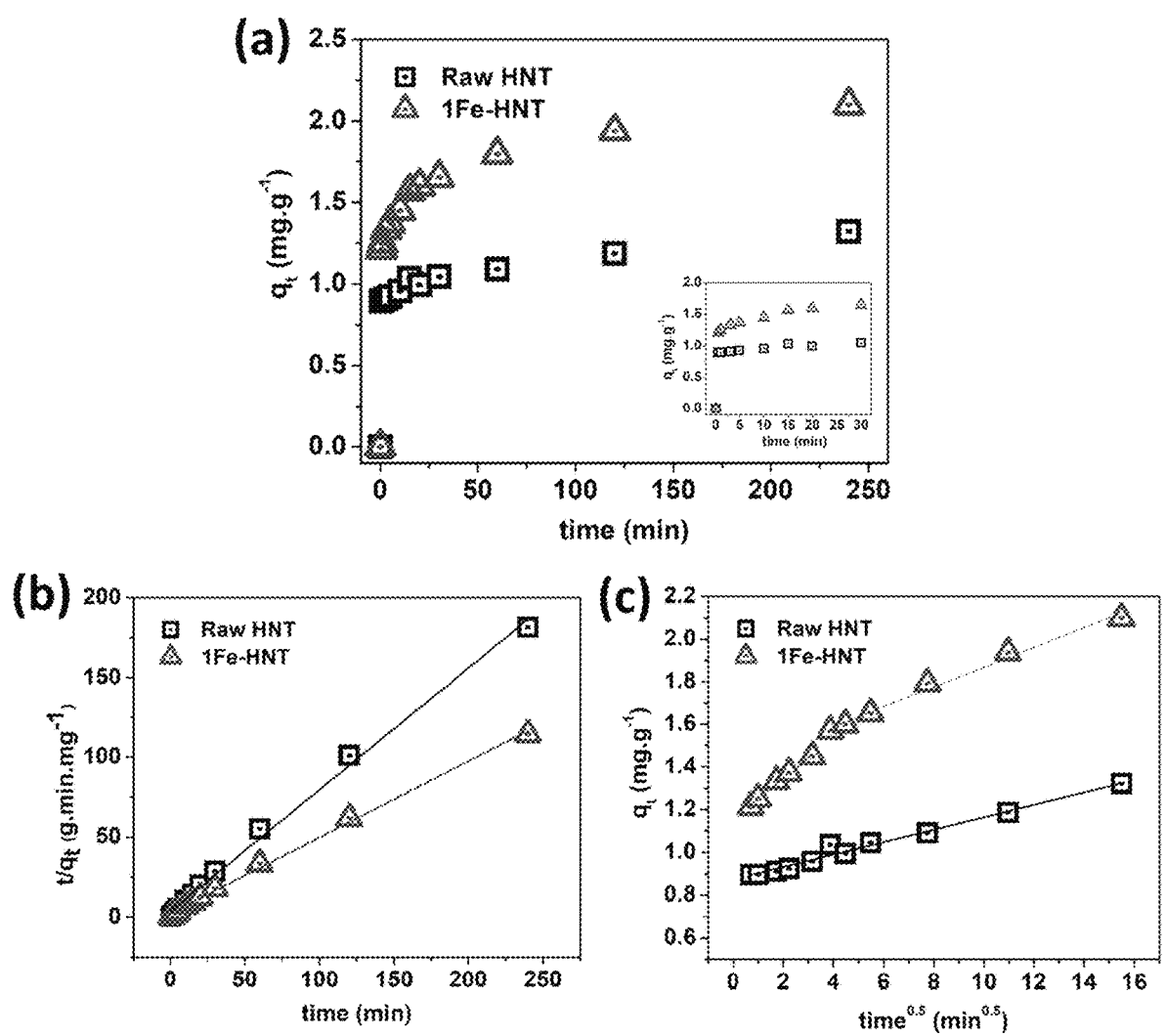
FIG. 4 is a data plot of (a) phosphate adsorption kinetics for raw HNT, 1Fe-HNT, and adsorption within the first 30-minutes (inset); (b) a model of phosphate adsorption kinetics with pseudo-second order; and (c) a model of phosphate adsorption kinetics with intraparticle diffusion.

The kinetic data fit with pseudo-first order and pseudo-second order models are shown in FIG. 4 at (b) and (c) and the key parameters are listed in Table 1. It is known that the pseudo-first order kinetic model provides a better fit for the initial stage of the reaction process, specifically for those sorbents with rapid adsorption propensity (Y. Ho, G. McKay, A comparison of chemisorption kinetic models applied to pollutant removal on various sorbents, Process safety and environmental protection, 76 (1998) 332-340). The values of the correlation coefficient R$^2$ for the pseudo-first order model is relatively lower than that for the pseudo-second order model. Furthermore, the calculated value of g$_{e,calc}$ (mg·g$^{-1}$) for 1Fe-HNT is significantly lower than the experimental value of q$_{e,exp}$ (mg·g$^{-1}$) obtained from the pseudo-first order model. This indicates that the pseudo-first order kinetic model is not suitable to describe the adsorption process.

Conversely, the calculated equilibrium capacities for HNT and 1Fe-HNT obtained from the pseudo-second order model (Y.-S. Ho, G. McKay, Pseudo-second order model for sorption processes, Process biochemistry, 34 (1999) 451-465) plot (FIG. 4 at (b)) are very similar to those obtained from experimental analysis as shown in Table 1. In addition, the higher correlation coefficients of raw HNT (R$^2$=0.995) and 1Fe-HNT (R$^2$=0.997) further suggest that the adsorption of phosphate onto HNTs and iron oxide modified HNTs follows pseudo-second order model more closely. Similar results have been reported in the literature on adsorption of phosphate by magnetite nanoparticles (M. Rashid, N. T. Price, M. Á. G. Pinilla, K. E. O'Shea, Effective removal of phosphate from aqueous solution using humic acid coated magnetite nanoparticles, Water research, 123 (2017) 353-360) and magnetic diatomite and illite clay (J. Chen, L.-g. Yan, H.-q. Yu, S. Li, L.-l. Qin, G.-q. Liu, Y.-f. Li, B. Du, Efficient removal of phosphate by facile prepared magnetic diatomite and illite clay from aqueous solution, Chemical Engineering Journal, 287 (2016) 162-172).

A plot of q$_t$ versus t$^{0.5}$ yielding a linear relationship that passes through the origin indicates that intraparticle diffusion is the sole rate-limiting step in the reaction, otherwise it is not the only rate-controlling step (W. J. Weber, J. C. Morris, Kinetics of adsorption on carbon from solution, Journal of the Sanitary Engineering Division, 89 (1963) 31-60; M. Hamayun, T. Mahmood, A. Naeem, M. Muska, S. Din, M. Waseem, Equilibrium and kinetics studies of arsenate adsorption by FePO 4, Chemosphere, 99 (2014) 207-215). As shown from the results in FIG. 4($c$) and Table 1, the linear plots of both HNT and 1Fe-HNT deviated from the origin; which indicate that intraparticle diffusion is involved in the adsorption process but is not the only rate-determining step. The value of C provides an insight onto the thickness of the boundary layer. In general, the larger the C value, the greater is the boundary layer effect (i.e., the greater is the contribution of surface adsorption in the rate-determining step); while a value of zero indicates that intra-particle diffusion dominates throughout the adsorption process. Also, higher values of C typically depict higher adsorption (A. Salifu, Fluoride Removal from Groundwater by Adsorption Technology, CRC Press, 2017).

The q$_t$ versus t$^{0.5}$ plot of raw HNT shows the existence of one rate while the plot for 1Fe-HNT shows two linear regimes; which implies a multi-stage adsorption process (J. Chen, L.-g. Yan, H.-q. Yu, S. Li, L.-l. Qin, G.-q. Liu, Y.-f Li, B. Du, Efficient removal of phosphate by facile prepared magnetic diatomite and illite clay from aqueous solution, Chemical Engineering Journal, 287 (2016) 162-172; J. Zhou, S. Yang, J. Yu, Z. Shu, Novel hollow microspheres of hierarchical zinc—aluminum layered double hydroxides and their enhanced adsorption capacity for phosphate in water, Journal of hazardous materials, 192 (2011) 1114-1121). The initial linear regime is a result of external surface adsorption, driven by the initial phosphate concentration. The second linear regime signifies that phosphate species diffuse within the pores of the hollow HNT over time, as is typical in the case for intraparticle diffusion. This result is significant in that it provides further evidence that coating HNTs with iron oxide nanoparticles enhances the adsorption of phosphate on the surface as well as opposed to adsorption only existing in the lumen for raw HNT. From Table 1, the rate constant for 1Fe-HNT in the first regime (k$_{p1}$) is greater than the second (k$_{p2}$); this indicates that intraparticle diffusion is the rate determining step of the entire adsorption process (J. Chen, L.-g. Yan, H.-q. Yu, S. Li, L.-l. Qin, G.-q. Liu, Y.-f Li, B. Du, Efficient removal of phosphate by facile prepared magnetic diatomite and illite clay from aqueous solution, Chemical Engineering Journal, 287 (2016) 162-172; P. Luo, Y. Zhao, B. Zhang, J. Liu, Y. Yang, J. Liu, Study on the adsorption of Neutral Red from aqueous solution onto halloysite nanotubes, Water research, 44 (2010) 1489-1497).

TABLE 1

Kinetic parameters for phosphate adsorption onto HNT and 1Fe-HNT.

| Kinetic models | Sorbents | |
| --- | --- | --- |
| | Raw HNT | 1Fe-HNT |
| $q_{e,\ exp}$ (mg · g$^{-1}$) | 1.32 | 2.10 |
| Pseudo-first order | | |
| $q_{e,\ calc}$ (mg · g$^{-1}$) | 1.13 | 0.14 |
| $k_1$ (min$^{-1}$) | 0.0691 | 0.0299 |
| $R^2$ | 0.906 | 0.967 |
| Pseudo-second order | | |
| $q_{e,\ calc}$ (mg · g$^{-1}$) | 1.31 | 2.10 |
| $k_2$ (g · mg$^{-1}$ · min$^{-1}$) | 0.174 | 0.107 |
| $R^2$ | 0.995 | 0.997 |
| Intra-particle diffusion | | |
| $k_p$ (mg · g · min$^{0.5}$) | 0.0290 | |
| C | 0.874 | |
| $R^2$ | 0.980 | |
| $k_{p1}$ (mg · g · min$^{0.5}$) | | 0.0959 |
| $C_1$ | | 1.15 |
| $R^2$ | | 0.988 |
| $k_{p2}$ (mg · g · min$^{0.5}$) | | 0.0465 |
| $C_2$ | | 1.40 |
| $R^2$ | | 0.986 |

Figure 5:
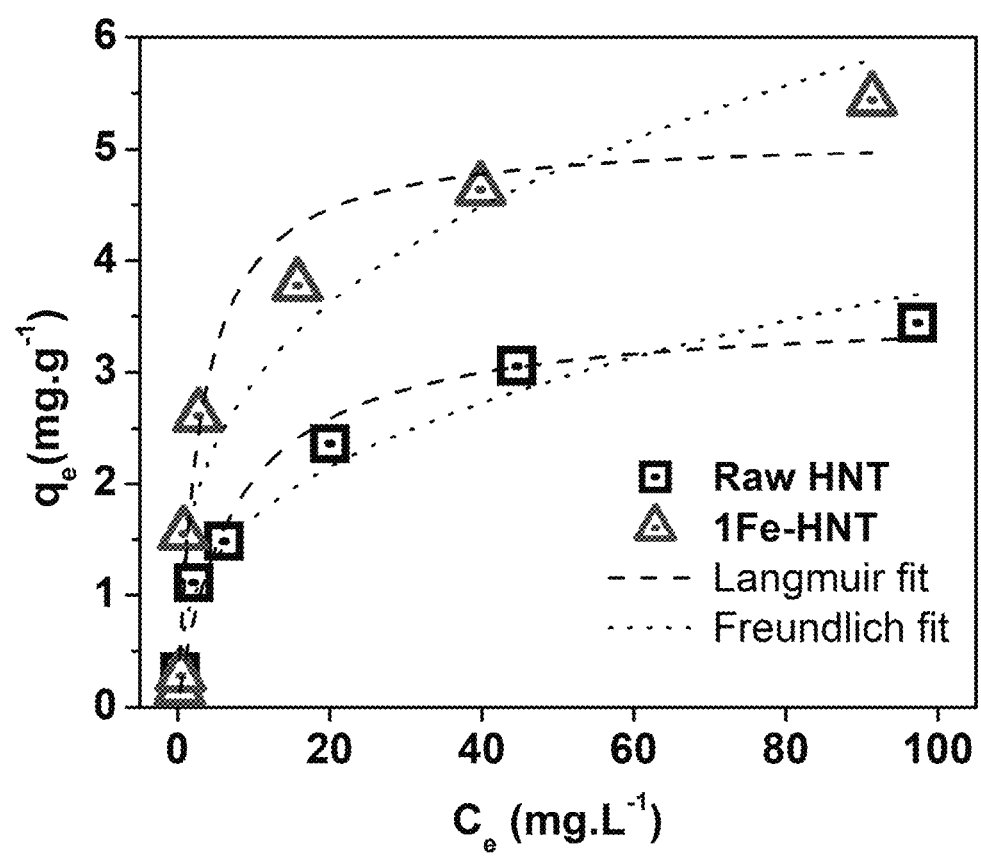
FIG. 5 is a graph of the effect of initial concentration on the adsorption capacity of raw HNT and 1Fe-HNT.

The following are example adsorption isotherms of an embodiment. The Langmuir and Freundlich isotherms are presented in FIG. 5 and the key parameters are listed in Table 2. The highest correlation coefficients for HNT ($R^2$=0.973) and 1Fe-HNT ($R^2$=0.955) are derived by fitting the equilibrium data with a Langmuir isotherm model. The monolayer capacities are near the experimental adsorption capacity results, indicating an agreement with the Langmuir model. The calculated values for $R_L$ of 0.070 and 0.029 for HNT and 1Fe-HNT, respectively, confirm that the adsorption process is favorable (K. Y. Foo, B. H. Hameed, Insights into the modeling of adsorption isotherm systems, Chemical engineering journal, 156 (2010) 2-10.). These results indicate that the surfaces of HNTs and 1Fe-HNTs are relatively uniform and that a monolayer of phosphate coverage dominates the adsorption process. It has been observed in previous studies (R. M. Cornell, U. Schwertmann, The iron oxides: structure, properties, reactions, occurrences and uses, John Wiley & Sons, 2003) that anion adsorption at any pH increases with the increase in adsorbate species concentration. For the graph in FIG. 5, the contact time was 240 minutes, the pH was 4, the sorbent dosage was 3 gL$^{-1}$, and a shaking speed of 240 rpm.

The Freundlich isotherm model showed lower correlation coefficients but $R^2$ values were greater than 0.90 for both sorbents (Table 2). The Freundlich constant $K_F$ is associated with the adsorption capacity of the sorbent; a higher value indicates a higher affinity for the adsorbate (P. Luo, Y. Zhao, B. Zhang, J. Liu, Y. Yang, J. Liu, Study on the adsorption of Neutral Red from aqueous solution onto halloysite nanotubes, Water research, 44 (2010) 1489-1497).

TABLE 2

Langmuir and Freundlich isotherm parameters for phosphate adsorption on HNT and 1Fe-HNT.

| Equilibrium adsorption models | Sorbents | |
| --- | --- | --- |
| | Raw HNT | 1Fe-HNT |
| $q_{e,\ exp}$ (mg · g$^{-1}$) | 3.43 | 5.46 |
| Langmuir | | |
| $X_m$ (mg · g$^{-1}$) | 3.56 | 5.13 |
| B | 0.133 | 0.339 |
| $R_L$ | 0.070 | 0.029 |
| $R^2$ | 0.973 | 0.955 |
| Freundlich | | |
| $K_F$ (mg g$^{-1}$(dm$^3$/g)$^n$) | 0.769 | 1.42 |
| 1/n | 0.342 | 0.312 |
| $R^2$ | 0.952 | 0.904 |

Figure 6:
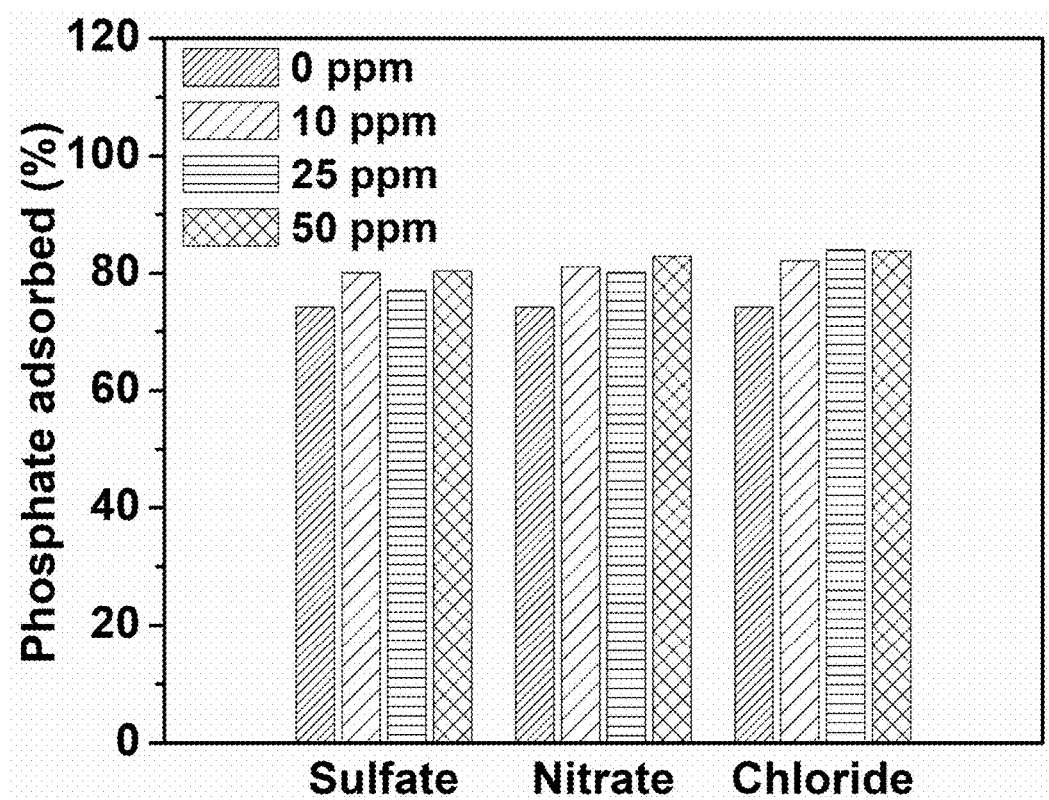
FIG. 6 is a chart of the effect of common coexisting ions on the adsorption capacity of Fe-HNT.

The following provides the effect of coexisting anions in an embodiment. In water and wastewater, anions such as sulfate, nitrate, and chloride coexist with phosphate ions and will likely compete for adsorption sites. Thus, the effect of these anions on the adsorption capacity is investigated and the results are shown in FIG. 6. It is observed that the addition of the coexisting anions to the solution does not impede the removal of phosphate from water, rather enhance it. For the graphs in FIG. 6, the initial phosphate concentration was 10 mgL$^{-1}$, the contact time was 240 minutes, the sorbent dosage was 3 gL$^{-1}$, and the shaking speed was 240 rpm.

Although the presence of anions in a solution have generally been reported to compete for adsorption sites, the total adsorption capacity of some metal oxides has been found to be unaffected or has increased (M. Li, J. Liu, Y. Xu, G. Qian, Phosphate adsorption on metal oxides and metal hydroxides: A comparative review, Environmental Reviews, 24 (2016) 319-332; W.-H. Lee, J.-O. Kim, Effect of coexisting components on phosphate adsorption using magnetite particles in water, Environmental Science and Pollution Research, (2017) 1-7). Specific additives, such as NaCl, NaNO$_3$, and KNO$_3$ have been found to enhance phosphate removal (M. Li, J. Liu, Y. Xu, G. Qian, Phosphate adsorption on metal oxides and metal hydroxides: A comparative review, Environmental Reviews, 24 (2016) 319-332). It can also be inferred that chloride may contribute in the adsorption of phosphate from the solution (M. Li, J. Liu, Y. Xu, G. Qian, Phosphate adsorption on metal oxides and metal hydroxides: A comparative review, Environmental Reviews, 24 (2016) 319-332). A similar phenomenon was reported by Zhang and coworkers (G. Zhang, H. Liu, R. Liu, J. Qu, Removal of phosphate from water by a Fe—Mn binary oxide adsorbent, Journal of colloid and interface science, 335 (2009) 168-174) and Giesler et al. (R. Giesler, T. Andersson, L. Lövgren, P. Persson, Phosphate sorption in aluminum-and iron-rich humus soils, Soil Science Society of America Journal, 69 (2005) 77-86) who used other metal oxides for phosphate adsorption. It is thus deduced that anions that adsorb via outer-sphere complexation, are highly sensitive to ionic strength. Consequently, the adsorption of these anions is inhibited by competition with other weakly adsorbing coexisting anions. On the contrary, anions that adsorb by inner-sphere complexation either display little sensitivity to ionic strength or respond to increasing ionic strength with increased adsorption (G. Zhang, H. Liu, R. Liu, J. Qu, Removal of phosphate from water by a Fe—Mn binary oxide adsorbent, Journal of colloid and interface science, 335 (2009) 168-174; R. Giesler, T. Andersson, L. Lövgren, P. Persson, Phosphate sorption in aluminum- and iron-rich humus soils, Soil Science Society of America Journal, 69 (2005) 77-86). Chubar and coworkers (N. Chubar, V. Kanibolotskyy, V. Strelko, G. Gallios, V. Samanidou, T. Shaposhnikova, V. Milgrandt, I. Zhuravlev, Adsorption of phosphate ions on novel inorganic ion exchangers, Colloids and Surfaces A: Physicochemical and Engineering Aspects, 255 (2005) 55-63) attributed this phenomenon to intermediate complex formation by chloride anions (by replacing the surface hydroxyl anions) with metal oxides; such complexation reduce the energy required for chelation between $H_2PO_4^-$ and metal oxide surfaces (M. Li, J. Liu, Y. Xu, G. Qian, Phosphate adsorption on metal oxides and metal hydroxides: A comparative review, Environmental Reviews, 24 (2016) 319-332; N. Chubar, V. Kanibolotskyy, V. Strelko, G. Gallios, V. Samanidou, T. Shaposhnikova, V. Milgrandt, I. Zhuravlev, Adsorption of phosphate ions on novel inorganic ion exchangers, Colloids and Surfaces A: Physicochemical and Engineering Aspects, 255 (2005) 55-63).

Figure 7:
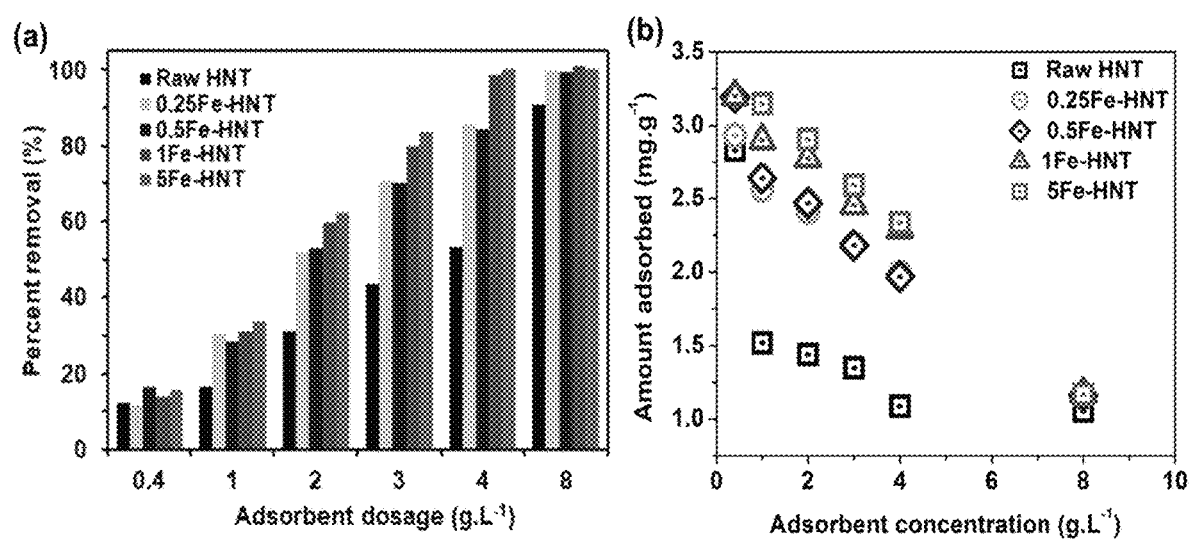
FIG. 7 is a graph of (a) the effect of adsorbent dosage on phosphate removal depicted in percent removal and (b) the amount adsorbed of per gram of sorbent.

Regarding FIG. 7, the graph shows the effect of adsorbent dosage on phosphate removal depicted in percent removal at (a) and the amount adsorbed per gram of sorbent at (b). In this embodiment, the initial phosphate concentration was 10 $mgL^{-1}$, the pH was 5, and the contact time was 120 minutes. Four separate concentrations of iron in the nanomaterial are disclosed in this particular graph. For instance, the nanomaterial may include 0.25 wt % iron modified HNT, 0.50 wt % iron modified HNT, 1.0 wt % iron modified HNT, and 5.0 wt % iron modified HNT.

In an embodiment, the disclosure includes a facile, sustainable procedure for the preparation of a highly adsorbent iron oxide modified halloysite nanotube adsorbent that can be used for a number of suitable applications. In a particular embodiment, the iron oxide modified halloysite nanotube adsorbent is highly selective toward phosphate. In an embodiment, the adsorbent can be used for the removal of heavy metals from water. It can also be used to move arsenic from water. The adsorbent can also be applied in wastewater treatment. The adsorbent can also be used for desalination. In an embodiment, the adsorbent can be used in the treatment of contaminated groundwater. In another embodiment, the adsorbent can be used in a packed bed filter and used for wastewater treatment in a scale setup. In another embodiment, a packed bed filter with the adsorbent can be used in tandem with a granulated activated carbon filter or with a membrane filter.

It should be noted that, in an embodiment, the present disclosure does not make use of a nitrogen atmosphere to prepare the adsorbent. This is because in an embodiment, the adsorbent does not use magnetic particles. Further, the present disclosure may make use of iron oxide nanoparticles with a diameter of approximately from 5 nm to 6 nm. In an embodiment, the iron oxide nanoparticles have a diameter of about 5.6 nm.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claim.

The invention is claimed as follows:

1. A method for treating a fluid comprising:
providing a nanomaterial including a halloysite nanomaterial modified with $Fe_2O_3$; and
using the nanomaterial for treating the fluid.

2. The method of claim 1, wherein the halloysite nanomaterial includes a halloysite nanotube material.

3. The method of claim 1, wherein the nanomaterial is used to remove phosphate from the fluid.

4. The method of claim 1, wherein the fluid is water.

* * * * *